Oct. 17, 1939.　　　　G. H. JUMP　　　　2,176,716
REGULATING DEVICE
Filed May 11, 1935
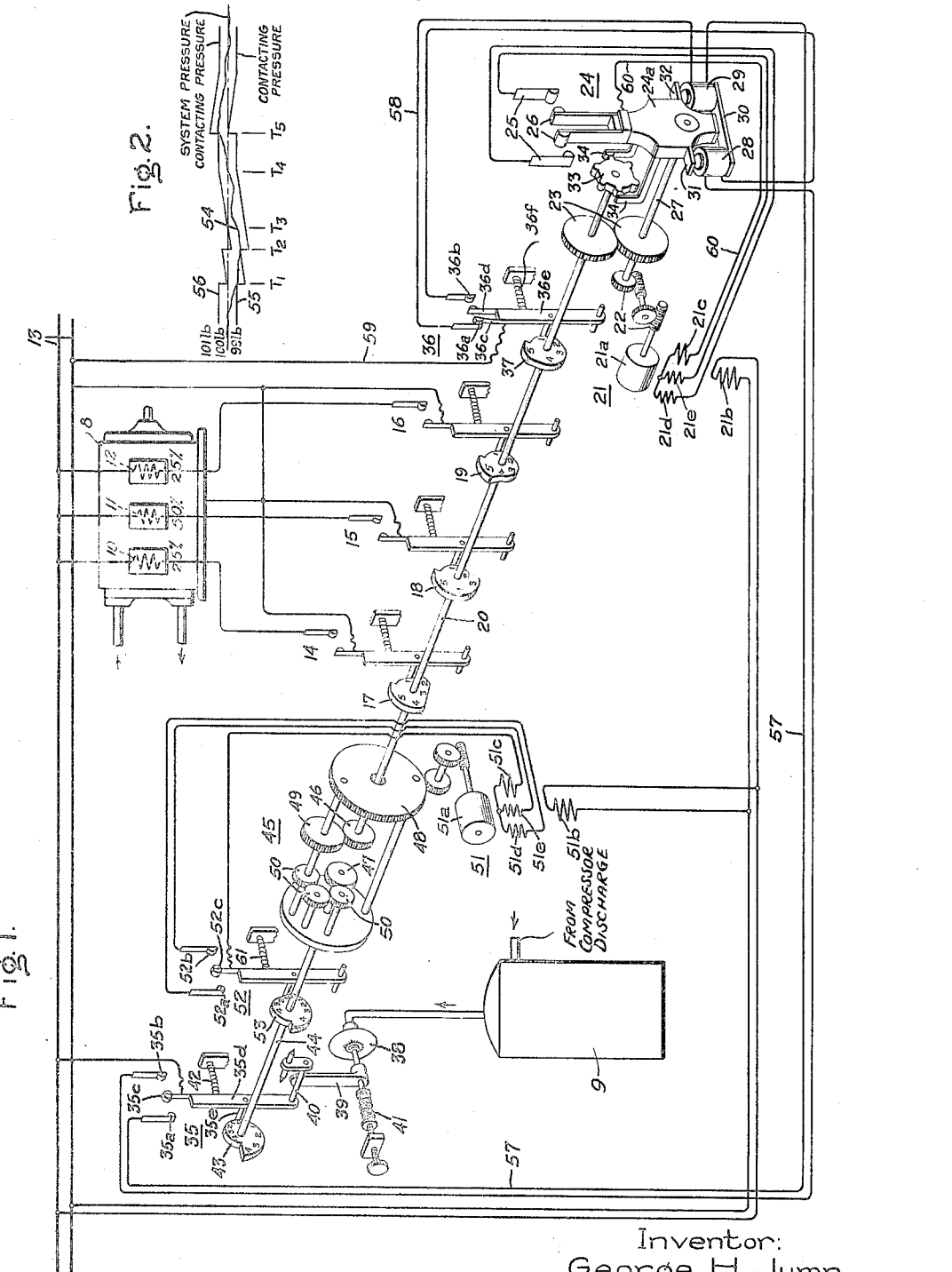
Inventor:
George H. Jump,
by Harry E. Dunham
His Attorney.

Patented Oct. 17, 1939

2,176,716

UNITED STATES PATENT OFFICE 2,176,716

REGULATING DEVICE

George H. Jump, Buffalo, N. Y., assignor to General Electric Company, a corporation of New York Application May 11, 1935, Serial No. 21,005

25 Claims. (Cl. 230—24)

This invention relates to regulating devices, more particularly to devices for regulating an operating characteristic of a machine, system or apparatus, such for example as the voltage of a dynamo electric machine or the pressure of a fluid pressure system, and it has for an object the provision of a simple, reliable and improved device of this character.

Devices used heretofore have produced correcting or restoring actions proportional to the amount of deviation of the regulated characteristic from a desired value. For example, in a fluid pressure system in which it was desired to hold one hundred pounds pressure and with the pressure falling as a result of increased demand on the system, regulating devices of the type heretofore used might respond at ninety-nine pounds to initiate a correcting action. If the demand did not increase further, the pressure would remain at ninety-nine pounds, but the regulator would not take any further action to restore the pressure to one hundred pounds. However, if the demand continued to increase and the pressure continued to fall, the regulating device would respond to initiate a further correcting action, but not until the pressure dropped to a lower value, such as ninety-eight pounds, and the action would be similar for still further changes in the pressure. In other words, the restoring action initiated by these devices was proportional to the differential between the actual value of the characteristic and the value which it was desired to maintain, with the result that the characteristics varied through a fairly wide range of values. Although regulators of this type were operative, and in a measure even satisfactory, they left something to be desired with respect to holding the regulated characteristics within a narrow range of variation. Accordingly, a further object of this invention is the provision of a regulator that will hold the regulated characteristics within closer limits of the desired value than devices of this character used heretofore, while at the same time substantially eliminating over-shooting or hunting action.

In carrying the invention into effect in one form thereof, means are provided for responding to a predetermined value of the operating characteristic to be regulated for actuating the means for controlling the characteristic to restore it to the desired value, and means are provided for changing the response setting of the responsive means thereby temporarily interrupting the correcting action, together with means for restoring the original setting of the responsive means after a predetermined interval of time to provide for further correcting action if the differential between the actual value of the characteristic and the value to be held remains the same or increases. Stated in other words, the device will initiate successive correcting actions at predetermined time intervals unless this differential is actually lessened during these time intervals.

In illustrating the invention in one form thereof it is shown as embodied in apparatus adapted for controlling the pressure of a fluid pressure system, such for example, as an air or gas compressor system having a series of control or unloading valves, each acting to control a partial loading or unloading of the compressor cylinder so as to vary the capacity of the cylinder in accordance with the number of valves operated.

For a better and more complete understanding of the invention, reference should now be had to the following specification and to the accompanying drawing in which Fig. 1 is a simple diagrammatical illustration of an embodiment of the invention, and Fig. 2 is a chart of characteristic curves explaining the operation thereof.

Referring now to the drawing, a plurality of solenoids 10, 11 and 12 are provided for actuating the means which control the operating characteristics of an apparatus or system so as to correct for any deviation from the value which it is desired to maintain. For example, in an air or gas compressor system in which it is desired to maintain the pressure substantially constant, the solenoids 10, 11 and 12 may control the unloading valves of the cylinder of a compressor 8. Since the specific structure of the compressor constitutes no part of the present invention, it is illustrated conventionally in the drawing. The discharge of the compressor is connected by suitable piping to a receiver 9. Many arrangements and types of unloading valves are possible, but for the purposes of illustration, it is assumed that when the unloading valve controlled by the solenoid 10 is closed and those controlled by the solenoids 11 and 12 are opened, the compressor is operating at twenty-five per cent capacity, and that when the valve controlled by solenoid 11 is closed and the other two are opened, the compressor is operating at fifty per cent capacity, and that when the valve controlled by solenoid 12 is closed and the other two are opened, the compressor is operating at twenty-five per cent capacity. Thus, if the valve controlled by solenoid 11 is closed at the same time that one of the other two valves is closed, while the third valve is opened, the system will operate at seventy-five per cent capacity. With all valves closed the compressor will operate at one hundred per cent capacity.

The solenoids 10, 11 and 12 are energized from a supply source 13 to which they are arranged to be connected by means of switching devices 14, 15 and 16, respectively. Each of the switching devices 14, 15 and 16 comprises a pair of contacts which are normally maintained open by any suitable means such for example as a spring. The switches 14, 15 and 16 are operated to their closed positions by means of cams 17, 18 and 19 arranged on a cam shaft 20. The cam shaft 20 is rotated at a speed which is preferably substantially constant, by any suitable driving means, such for example as the reversible electric motor 21, to the drive shaft of which the shaft 20 is connected through suitable worm reduction gearing 22 and gearing 23. Although the motor 21 may be of any suitable type it is illustrated as an alternating current motor having a rotor $21_a$, a field coil $21_b$, a secondary coil $21_c$ and shading coils $21_d$ and $21_e$. The main field coil $21_b$ is supplied from a suitable source of alternating current such for example as the source 13 and the shading coils $21_d$ and $21_e$ are connected in parallel with each other and in series relationship with the secondary coil $21_c$. These shading coils provide for rotation of the motor in one direction or the other depending upon which of the coils is energized. It will be understood of course that any other suitable type of motor may be utilized if desired. In order to control the direction and amount of rotation of the motor 21, suitable combined directional and limit switch mechanism 24 is provided. This combined mechanism comprises a pair of stationary contacts 25 and a pair of cooperating movable contacts 26. The latter contacts are mounted on a movable yoke member $24_a$, which in turn is pivotally mounted upon a counter shaft 27, with which it is in frictional engagement so that rotation of the shaft 27 urges the yoke $24_a$ either in a clockwise or counter-clockwise direction, depending upon the direction of rotation of the shaft.

A pair of electro-magnets 28, 29 are mounted on a base member 30 on opposite sides of the counter shaft 27. The yoke member $24_a$ is provided with a pair of armatures 31 and 32 arranged in cooperative relationship with the electromagnets 28 and 29 respectively. When either of the electromagnets 28 or 29 is energized, the cooperating armature member is attracted and causes the yoke member $24_a$ to rotate in one direction or the other about the shaft 27, depending upon which of the two electromagnets is energized. As shown, a sprocket like member 33 is mounted on the cam shaft 20 and a pair of L-shaped springs 34 are secured to the yoke member $24_a$. These springs are arranged on opposite sides of the sprocket member 33 and the distance between them is such that they press against diametrically opposite teeth of the sprocket member 33 when the latter member is in the position illustrated in the drawing. The springs 34 have a force that is sufficient to overcome the force of the frictional drive between the shaft 27 and the yoke $24_a$, and thus these springs serve to position the yoke member $24_a$ with the movable contacts 26 centered between the stationary contacts 25 when the electromagnets 28 and 29 are deenergized, even though the shaft 27 is rotating.

When the left-hand movable contact 26 is in engagement with the left-hand stationary contact 25 the energizing circuit for the shading coil $21_d$ is completed whilst when the right-hand movable contact member 26 is in engagement with the right-hand stationary contact member 25, a circuit is completed for the shading coil $21_e$.

As shown, the operating coils of the electromagnets 28 and 29 are energized from a suitable source, such for example as the source 13, to which they are arranged to be connected by means of the master switch device 35 and limit switch device 36. The master switch 35 is in the form of a selector switch, i. e., it has a pair of stationary contacts $35_a$ and $35_b$ respectively connected in the energizing circuit of the electromagnets 29 and 28 and, a movable contact member $35_c$ connected to one side of the source 13 and arranged in the center between the two stationary contacts $35_a$ and $35_b$. Similarly the limit switch device 36 has a pair of stationary contacts $36_a$ and $36_b$ respectively connected in series relationship in the energizing circuit of the electromagnets 29 and 28 and a pair of movable contact members $36_c$ and $36_d$, arranged between and in cooperative relationship with the stationary contacts. The movable contacts $36_c$ and $36_d$ are carried upon a pivoted contact arm $36_e$. This arm is provided with a pin which is arranged to be engaged by a cam 37 mounted for rotation on the cam shaft 20. A spring $36_f$ urges the contact carrying arm $36_e$ to the left, that is to say, in a counter-clockwise direction about its pivot.

As shown, the cam 37 is shaped so that when it is in the No. 1 position in which it is shown, it allows the spring $36_f$ to move the movable contact $36_c$ into engagement with the stationary contact $36_a$ and to move the movable contact $36_d$ out of engagement with the stationary contact $36_b$ and when the cam 37 is in the No. 5 position, it over-powers the force of the spring to move the movable contact $36_c$ out of engagement with the stationary contact $36_a$ and to move the movable contact $36_d$ into engagement with the stationary contact $36_b$. When the cam 37 is in the second, third and fourth intermediate positions, each movable contact member is in engagement with its cooperating stationary contact. Thus, the arrangement is such that in the second, third or fourth intermediate positions of the cam 37, the motor 21 can be energized for rotation in either direction whereas when the cam 37 is in either the No. 1 or No. 5 limiting position, the motor 21 can only be energized for rotation in a direction opposite to that which brought the cam to its limiting position.

The movable contact $35_c$ of the master switch 35 is mounted on a supporting structure $35_d$ which in turn is mounted for rotation about a pivot as indicated. Suitable means 38 responsive to a variation or deviation of the characteristic to be regulated from the constant value which it is desired to maintain, are provided for actuating the movable member of the master switch 35. For a fluid pressure system, in which it is desired to maintain fluid pressure constant at a desired value, the means 38 is preferably in the form of a pressure diaphragm connected by means of a pipe to some part of the pressure system such for example as the receiver 9 of an air or gas compressor system. An upright movable member 39 is attached to the diaphragm member of the pressure responsive means so as to move therewith in response to changes in pressure. This upright member bears against a pin 40 carried in the supporting structure 35d of the master switch device 35. An adjusting spring 41 is provided for adjusting the setting of the pressure responsive means to any desired value. When the pressure of the system increases above the value which the device is set to hold, the upright member 39 is moved toward the left, thereby causing the supporting structure 35d to rotate in a clockwise direction to effect engagement of the movable contact member 35c with the stationary contact member 35b. Similarly when the pressure falls below the desired value, the spring 41 moves the upright member 39 toward the right thereby allowing the spring 42 to rotate the supporting structure 35d in a counterclockwise direction to effect engagement of the movable contact member 35c and the stationary contact member 35a.

As shown, supporting structure 35d is provided with a pin 35e which is engaged by a cam member 43 which is mounted upon a cam shaft 44. This cam has a central or zero position, four counter-clockwise or positive positions and four clockwise or negative positions. When the system pressure is normal, that is to say when it is at the desired value, the cam 43 is in the central or zero position in which it is shown, and the movable contact member 35c is in its central position out of engagement with the stationary contact members 35a and 35b.

The cam member 43 serves to change the pressure response setting of the pressure responsive mechanism and to this end, the cam shaft 44 is connected through a planetary differential mechanism 45 to the cam shaft 20. This differential device 45 is illustrated as comprising an input gear 46, an output gear 47, and a spider 48 carrying planetary members 49, 50 in engagement with the input and output gears 46 and 47 respectively. The spider member 48 is driven by any suitable driving means, such for example as the electric motor 51, with the drive shaft of which the gearing of the spider member 48 is connected by suitable connecting gearing as shown in the drawing.

Although the motor 51 may be of any suitable type, it is preferably an alternating current motor similar to the motor 21 having a rotor member 51a, a main field coil 51b, a secondary coil 51c and two shading coils 51d and 51e which provide for rotation in opposite directions. The rotation of the motor 51 is controlled by a master switching device 52 illustrated as comprising a pair of stationary contacts 52a and 52b respectively connected to the terminals of the shading coils 51d and 51e, and a movable contact member 52c which is connected to one terminal of the secondary coil 51c, the opposite terminal of which is connected to the common point of the shading coils 51d and 51e. Power is supplied to the main field coil 51b from a suitable source, such as the source 13b to which the coil 51b is connected as illustrated. Movement of the movable contact member 52c into engagement with one or the other of the stationary contacts 52a, 52b is controlled by means of a cam 43 mounted on the cam shaft 44. This cam is similar in shape to the cam 43 and has a central or zero position and four counter-clockwise or positive positions and four clockwise or negative positions. When the cam is in any position other than the zero position, the movable contact member 52c is actuated into engagement with one or the other of the stationary contact members 52a, 52b. The connections between the stationary contact members and the shading coils are such that the motor 51 is energized for rotation in a direction to return the cams 53 and 43 to their zero positions.

With the above understanding of the elements and their organization, the operation of the regulating device itself will readily be understood from the following detailed description of a typical operation:

In explaining this operation, reference is made to the chart of Fig. 2 in which the system pressure is represented by the curve 54, the contacting pressure of the movable contact 25c with the stationary contact 35a by the stepped or big-zagged line 55 and the contacting pressure of the movable contact and the stationary contact 35b is represented by the curve 56. Let it be assumed that it is desired to hold the system pressure constant at some predetermined value, such for example as one-hundred pounds. Further let it be assumed that the cams 17, 18 and 19 are in the No. 3 position so that the solenoids 10 and 12 are deenergized and the solenoid 11 is energized with the result that the compressor is operating at fifty per cent capacity. If at this point, the pressure begins to decrease in response to an increased demand on the system, the diaphragm operated upright arm 39 will move to the right. If the pressure responsive mechanism is set to hold one hundred pounds pressure by adjustment of the spring 41, the movable contact member 35c will be actuated into engagement with the stationary contact member 35a when the system pressure has decreased to some lower value, such for example as ninety-nine pounds. This point in the operation is represented by the vertical line $T_1$ in Fig. 2 and is shown diagrammatically by the intersection of the system pressure curve 54 with the contacting pressure curve 55. Engagement of the movable contact member 35c with the stationary contact member 35a completes an energizing circuit from the upper side of the supply source 13, through contacts 35c and 35a, conductor 57, operating coil of electromagnet 29, conductor 58, contacts 36a and 36c of limit switch 36, thence by conductor 59 to the lower side of the supply source 13. In response to the energization of electromagnet 29, the yoke member 24a is rotated against the pressure of the springs 34 in a clockwise direction, thereby actuating the right-hand movable contact member 26 into engagement with the right-hand stationary contact member 25 to complete a circuit for the shading coil 21e of the motor 21. This circuit is readily traced from the lower terminal of the shading coil 21e through the contacts 25 and 26 and thence by conductor 60 to and through the secondary coil 21c to the upper terminal of the shading coil 21e. Since the main field coil 21b is connected to the supply source 13, the motor 21 begins to rotate in a direction such that the cam shaft 20 is rotated in a counter-clockwise direction as viewed from the right. As the cam shaft 20 begins to rotate, the teeth of the sprocket member 33 are rotated out of engagement with the springs 34, and as a result the contacting tips of these springs fall into the cut-away spaces between the teeth so that the springs no longer tend to center the yoke member 24a and the movable contacts 26.

Rotation of the cam shaft 20 drives the cam shaft 44 through the differential device 45 in a counter-clockwise direction. As this rotation continues, the cam 43 is rotated in a counter-clockwise direction toward the No. 1 negative position so as to bias the movable contact member 35c away from engagement with the stationary contact member 35a.

Since the pressure responsive mechanism is set to effect engagement of these two contacts at the existing pressure value, it will be seen that the action of the cam 43 is in effect to change the setting of the pressure responsive mechanism.

Separation of the contacts 35c and 35a interrupts the energizing circuit of the electro-magnet 29. However, since the contact tips of the springs 34 rest in depressions between teeth, the frictional engagement between the counter shaft 27 and the yoke 24a is sufficient to maintain the right-hand movable contact 26 in engagement with the right-hand stationary contact 25 thereby maintaining the motor 21 energized and in rotation. When the motor 21 has rotated the cam 17 from the No. 3 to the No. 4 position, the movable contact member of the switching device 14 is actuated into engagement with the stationary member thereby to complete an energizing circuit for the solenoid 10. In response to its energization, the solenoid 10 closes the unloading valve which it controls thereby to increase the capacity of the compressor from fifty per cent to seventy-five per cent. This increase in the capacity of the compressor tends to check the fall of pressure or at least to decrease the rate thereof as indicated by the characteristic curve 54 of Fig. 2. As the cam 17 reaches its No. 4 position another pair of teeth of the sprocket member 33 are rotated into engagement with the contacting tips of the spring 34, and since the frictional drive between the counter shaft 27 and the yoke member 24a is insufficient to deflect the springs 34, the yoke member 24a and the movable contact members 26 are centered thereby interrupting the circuit of the shading coil 21e and stopping the motor 21.

When the cam member 17 reached its No. 4 position, the cam member 53 reached its No. 1 negative position, thereby actuating the movable contact member 52c into engagement with the stationary contact member 52b to complete an energizing circuit for the shading coil 51e of the motor 51, which circuit is obvious and requires no tracing. Since the main field coil 51b is connected to the supply source 13, the motor 51 rotates the differential spider 48 in a direction such as to rotate the cams 43 and 53 in a clockwise direction from their No. 1 negative positions to their zero positions. In the zero position of the cam 53, the movable contact member 52c is actuated out of engagement with the stationary contact member 52b thereby deenergizing and stopping the motor 51.

The rotation of the cam 43 by the motor 51 takes place at a very greatly reduced speed owing to the reduction gearing of the differential device 45. The effect of this rotation is to remove the bias that was placed on the movable contact member 35c by rotation of the motor 21. This bias is removed at a predetermined rate which of course is dependent upon the rate of rotation of the motor 51 and the reduction ratio of the differential device 45. If the system pressure should continue to fall owing to an increased demand on the system during the removal of the bias from the movable contact member 35c, the movable contact member 35c will again be actuated into engagement with the stationary contact member 35a before the bias is completely removed at the point of time represented by the vertical line T2 in Fig. 2. This reengagement of the contact member 35c and 35a will cause the device to operate and energize the solenoid 12 in a manner that is identical with that already described for the energization of the solenoid 10. The energization of the solenoid 12 will cause it to close its unloading valve so that the compressor will now operate at one hundred per cent capacity.

If the system pressure had not continued to decrease in the interval between the times T1 and T2 but had remained constant at ninety-nine pounds, the bias on the movable contact member 35c would have been completely removed at a time T3 indicated in Fig. 2 by the vertical line T3 through the intersection of the projection of the bias removal curve between T1 and T2 with the horizontal ninety-nine pound contacting pressure curve. It will be seen that it is not necessary for the pressure to decrease to a lower value, such for example as ninety-eight pounds in order to cause the mechanism to initiate a second correcting or restoring action. On the contrary, if the differential between the actual pressure and the pressure which it is desired to hold is not decreased between times T1 and T3 the device will be actuated at the time T3 to initiate a second correcting step. If the pressure remains constant at the decreased value of ninety-nine pounds, between the times T1 and T3, a second correcting step will be initiated at the time T3, or if the pressure should continue to decrease between times T1 and T3 a second correcting step will be initiated at a time T2 which is dependent upon the rate of pressure fall and the rate of bias removal.

Assuming that operation of the compressor at one hundred per cent capacity is more than sufficient to take care of the demand on the system, the system pressure will begin to rise at a rate substantially equal to the rate of bias removal. At time T4 the motor 51 is stopped and the cams 43 and 53 are again in their zero positions so that the bias on the contact member 35c is completely removed.

Since operation of the compressor at one hundred per cent capacity is more than sufficient to take care of the demand, the pressure will continue to rise until at time T5 when the pressure is at some value in excess of the value it is desired to hold, such for example as one hundred and one pounds, the movable contact member 35c is actuated into engagement with the stationary contact 35b thereby energizing the motor 21 for rotation in the reverse direction as a result of which the cams 17, 18 and 19 are rotated from the No. 5 positions to their No. 4 positions. In the No. 4 position of the cam 19, the contacts of the switching device 16 are opened and the solenoid 12 is deenergized. This results in opening the unloading valve controlled thereby and reducing the compressor capacity to seventy-five per cent.

When the motor 21 is energized for rotation in the reverse direction, the cams 43 and 53 are driven through the differential device 45 so as to rotate in a clockwise direction to their No. 1 positive positions. This allows the spring 42 to bias the movable contact member 35c out of engagement with the stationary contact member 35b and also allows the spring 61 to actuate the movable contact member 52c into engagement with the stationary contact 52a to complete a circuit for the shading coil 51d of the motor 51. As a result the motor 51 is energized for rotation in the reverse direction so that it rotates the differential spider member 48 in a counterclockwise direction so as to rotate the cam members 43 and 53 from their No. 1 positive positions to their zero positions. This results in removing the bias from the movable contact member 35c at a predetermined rate and finally in the zero position of the cam 53, the motor 51 is deenergized and stopped. The net result is that the adjustment of valves continues until the rate of pressure correction corresponds approximately with the rate of bias change or until the regulator's limiting valve positions have been reached. Since the regulator operates in response to rate of pressure correction rather than on pressure value alone, hunting is avoided and at the same time the pressure is held within narrower limits than would otherwise be possible.

It will thus be seen that the regulator setting is changed with each step of compressor output and that the regulator setting instead of having a fixed value corresponding to each compressor step, is changed at a fixed rate in relation to the compressor step position. This change is always in the direction to restore the regulator setting to a definite point between narrow limits and when this point is reached the regulator remains at rest until the demand on the system requires that a further correction be made. It will also be observed, that the correction and compressor output is carried one step beyond that necessary to meet the system demand and hold the pressure constant. The pressure, therefore, is changed at a rate corresponding to this excess, which in the embodiment chosen for illustration, is equal to one step of compressor output.

Although in accordance with the provisions of the patent statutes, this invention is described as embodied in concrete form, it will be understood that the invention is not limited to specific elements and connections shown since alterations and modifications will readily suggest themselves to persons skilled in the art without departing from the true spirit of this invention or from the scope of the annexed claims.

What I claim as new and desire to secure by Letters Patent of the United States, is:

1. A regulator for fluid pressure systems and the like comprising an electric motor and means actuated thereby for controlling the pressure of said system, means responsive to a predetermined value of pressure for energizing said motor, means actuated by said motor for changing the setting of said pressure responsive means, and means for restoring the original setting of said pressure responsive means at a predetermined rate.

2. A regulator for fluid pressure systems and the like comprising an electric motor and a plurality of electro-responsive devices controlled thereby for controlling the pressure of said system, means responsive to a predetermined value of pressure for energizing said motor, means actuated by said motor for changing the setting of said pressure responsive means and means for restoring the original setting at a predetermined rate thereby to provide for reenergization of said motor in response to continuation of pressure at said predetermined value.

3. In a control system, the combination with a variable capacity fluid compressor having a plurality of valves for controlling the loading and unloading of the compressor, a plurality of solenoids for controlling the operation of said valves, a motor for controlling the energization of said solenoids, a master switch for controlling the energization of said motor, means actuated by the pressure of said fluid for closing said switch, means actuated by said motor for controlling the time interval of energization of said motor upon each operation of said master switch, and means controlled by said time interval controlling means for controlling the direction of rotation of said motor.

4. Regulating apparatus for fluid pressure systems and the like comprising means for controlling the pressure of said system, means for actuating said pressure control means comprising a switching device having a stationary member and a movable member and means responsive to a predetermined value of fluid pressure for effecting engagement of said members, means for biasing said members out of engagement, and means for removing said bias at a predetermined rate to provide for reengagement of said members.

5. Regulating apparatus for fluid pressure systems and the like comprising means for controlling the pressure of said system, means for actuating said pressure control means comprising a switching device having a stationary contact and a movable contact and means responsive to a deviation of the fluid pressure from a predetermined value for effecting engagement of said contacts, means for biasing said contacts out of engagement to provide for deenergization of said pressure control means after an interval of time, and means for removing said bias to provide for reengagement of said contacts and reenergization of said control means in response to continued deviation of said pressure from said predetermined value.

6. Regulating apparatus for fluid pressure systems and the like comprising a pair of normally open contacts, means responsive to deviation of the pressure of said system from a predetermined value for effecting engagement of said contacts, an electric motor energized in response to engagement of said contacts and means controlled thereby for restoring said pressure to said predetermined value, means for biasing said contacts out of engagement to deenergize said motor, and means for removing said bias at a predetermined rate to provide for reenergization of said motor and said means controlled thereby if the restoration of said pressure is at less than a predetermined rate.

7. Regulating apparatus for fluid pressure systems and the like comprising a switching device having a pair of normally open contacts, means responsive to a deviation of the pressure of said system from a predetermined value for effecting engagement of said contacts, means for controlling said pressure comprising a plurality of solenoids and a motor energized in response to engagement of said contacts for controlling the energization of said solenoids to restore said pressure to said predetermined value, means actuated by said motor for temporarily biasing said contacts out of engagement, means for establishing a holding circuit to maintain said motor energized after separation of said contacts, means for interrupting said holding circuit after a predetermined amount of rotation of said motor, and a second motor for removing said bias at a predetermined rate to provide for reenegagement of said contacts and reenergization of said first motor to effect further control of said pressure if said restoration is at less than a predetermined rate.

8. A regulating device for fluid pressure systems and the like comprising a switching device having a pair of normally open contacts, a plurality of solenoids for controlling loading and unloading valves to control the pressure of said system, an electric motor controlled by said contacts and a plurality of cam switches actuated thereby for controlling the energization of said solenoids, means responsive to a deviation of the pressure of the system from a predetermined value for effecting engagement of said contacts thereby to cause said motor to energize one of said solenoids to restore said pressure to said predetermined value, a cam actuated by said motor for biasing said contacts out of engagement, a holding circuit for maintaining said motor energized after separation of said contacts, limit switch mechanism in said holding circuit for opening said holding circuit to deenergize said motor after predetermined rotation of said motor, and a second motor energized in response to operation of said first motor for removing said bias at a predetermined rate to provide for reengagement of said contacts and reenergization of said motor to effect energization of another of said solenoids if the rate of restoration of said pressure is at less than a predetermined value.

9. A control system comprising in combination a variable capacity fluid compressor, a plurality of valves for controlling the loading and unloading of said compressor, a plurality of solenoids for controlling the operation of said valves, an electric motor and a plurality of cams operated thereby for controlling the energization of said solenoids, means responsive to the pressure of the compressed fluid for controlling the energization and direction of rotation of said motor, means for limiting the rotation of said motor, a second motor and means actuated by said first motor for causing said second motor to reset said pressure responsive means to normal position.

10. A regulating device having a first movable member and a second movable member, means for moving said first member from a first position to a second position, means responsive to said movement for actuating said second member, means responsive to actuation of said second member for imparting a bias to move said first member from said second position to said first position, and an electrical device energized in response to said biasing movement for terminating said bias thereby to provide for repetition of the movement of said first member from said first position to said second position.

11. A regulating device having a stationary element, a first movable member and a second movable member, means for actuating said first member into engagement with said element, means responsive to said engagement of said member and element for actuating said second member, means responsive to actuation of said second member for biasing said first member out of engagement with said element and an electro-responsive device energized in response to actuation of said second member for removing said bias to provide for reactuation of said first member into engagement with said stationary element.

12. A regulating device having a stationary element and a movable member normally separated from said element, means for applying a force to said member to move it into engagement with said element, means for setting said member to engage said element in response to a predetermined value of said force, a second movable member, means responsive to engagement of said first movable member with said stationary element for effecting movement of said second member, means responsive to movement of said second member for biasing said first member out of engagement with said stationary element thereby to change said response setting, and means for restoring said response setting at a predetermined rate.

13. A regulator comprising in combination, a stationary element, a movable member normally separated from said element, means for applying a force to said member to move said member into engagement with said element, means for setting said member to engage said element in response to a force of a predetermined magnitude, a plurality of switching devices, means responsive to engagement of said member and element for actuating said switching devices, means actuated by said switch actuating means for temporarily biasing said member out of engagement with said element thereby to vary said response setting, and means responsive to said biasing movement for removing said bias and restoring said response setting at a predetermined rate.

14. A regulator comprising in combination a stationary element, a movable member normally separated from said element, means for applying a force to said member to move said member into engagement with said element, means for setting said member to engage said element in response to a predetermined value of said force, control means comprising a plurality of switching devices, a cam shaft for actuating said control means, means responsive to engagement of said member and element for setting said cam shaft in rotation to initiate actuation of said control means, means responsive to rotation of said cam shaft for temporarily biasing said movable member out of engagement with said element thereby to vary said response setting and to interrupt the actuation of said control means, and means responsive to biasing movement for removing said bias to restore said response setting to its former value at a predetermined rate.

15. A regulator comprising in combination a stationary contact, a movable contact normally separated from said stationary contact, a movable member, means for applying a force to said movable contact to move said movable contact into engagement with said stationary contact, means for setting said movable contact member to engage said stationary contact member at a predetermined value of said force, means responsive to engagement of said contacts for biasing said movable contact out of engagement with said stationary contact thereby to vary said response setting and electric motor means energized in response to said biasing movement for removing said bias to restore said response setting to its former value at a predetermined rate.

16. The combination with a variable capacity air or gas compressor of control valves on said compressor for controlling the loading and unloading of the compressor, an electric motor for controlling operation of said control valves, means responsive to a predetermined pressure value for controlling energizing of said motor, means driven by said motor for varying the response setting of said responsive means, and means for restoring the original setting thereof at a predetermined rate.

17. A regulator for apparatus having an operating characteristic to be regulated comprising in combination, a control device having an inactive position and operable from said position to an operating position in response to variation of said characteristic from a predetermined value, means responsive to the operation of said device to said operating position for controlling said apparatus to decrease said variation, means controlled by said operation for imparting a bias tending to actuate said device to said inactive position thereby to change the response setting of said regulator, and means for removing said bias to restore the original setting of said regulator.

18. A regulator for apparatus having an operating characteristic to be regulated comprising in combination, a control device having an inactive position and movable from said position to an operating position in response to a departure of said characteristic from a predetermined value, means responsive to movement of said device to said operating position for controlling said apparatus to reduce said departure, means controlled by said movement for imparting a bias tending to restore said device to said inactive position thereby to change the response setting of said regulator, and means responsive to the actuation of said apparatus controlling means for removing said bias at a predetermined rate to provide for a second actuation of said controlling means in the absence of a further increase of said departure.

19. A regulator for apparatus having an operating characteristic to be controlled comprising in combination, a control device having an inactive position and movable from said position to an operating position in response to departure of said characteristic from a predetermined value, a cam shaft, means responsive to operation of said device to said operating position for effecting rotation of said shaft, means controlled by said rotation for controlling said apparatus to decrease said departure, means responsive to said rotation for imparting a bias tending to restore said device to said inactive position to change the response setting of said regulator comprising a mechanical differential device connected to said cam shaft and a second shaft connected to said control device and driven through said differential device, and means responsive to rotation of said second shaft for driving said differential device to rotate said second shaft in a direction to remove said bias and thereby to restore the original setting of said regulator.

20. A regulator for apparatus having an operating characteristic to be regulated comprising in combination, a control device having an inactive position and an operating position, means for setting said device to move from said inactive position to said operating position in response to departure of said characteristic from a predetermined value, a cam shaft, means responsive to operation of said device to said operating position for effecting rotation of said shaft, means controlled by said rotation for controlling said apparatus to decrease said departure, a second shaft connected to said control device, a differential gearing mechanism having an output member and two input members, said output member being connected to said second shaft and one of said input members being connected to said cam shaft thereby to impart a bias to said control device, tending to restore said device to said inactive position in response to said rotation, to change the response setting of said departure responsive means, and means for driving the other input member to remove said bias at a predetermined rate.

21. A pressure governor for a fluid pressure system supplied from a variable capacity compressor comprising in combination, a control device having an inactive position and an operating position, pressure actuated means including a diaphragm for actuating said device, means for setting said pressure actuated means to effect operation of said device from said inactive position to said operating position in response to a departure of said pressure from a predetermined value, a cam shaft, means responsive to operation of said device to said operating position for effecting rotation of said shaft, means controlled by rotation of said shaft for controlling said compressor to decrease said departure, a rotatable member connected to said pressure actuated means, a differential gearing device having an output member and two input members, one of said input members being connected to said cam shaft and said output member being connected to said rotatable member to effect rotation of said rotatable member to impart a bias tending to restore said control device to said inactive position and thereby to change the response setting of said pressure actuated means, and means responsive to rotation of said rotatable member for driving said second input member to remove said bias at a predetermined rate.

22. The combination with a variable capacity air or gas compressor, of control valves on said compressor for controlling the loading and unloading of the compressor, electrically operated means for controlling operation of said control valves, means responsive to deviation from a predetermined pressure for controlling energizing of said electrically operated means, said means including a master switch, means including a cam for varying the setting of said master switch, an electric motor for rotating said cam, and means actuated by operation of the motor for deenergizing the motor.

23. The combination with a variable capacity air or gas compressor, of control valves on said compressor for controlling the loading and unloading of the compressor, solenoids for controlling the operation of said valves, means responsive to deviation from a predetermined pressure for controlling operation of said solenoids, said pressure responsive means including a master switch, means for varying the setting of said master switch, means for restoring the original setting of said switch, said pressure responsive means including selective means for selectively energizing said solenoids, an electric motor for operating said selective means, and means actuated by operation of said motor for controlling the time interval of each energization of the motor.

24. The combination with a variable capacity air or gas compressor, of control valves on said compressor for controlling the loading and unloading of the compressor, solenoids for operating said control valves, means responsive to deviation from a predetermined pressure for controlling energizing of said solenoids, said pressure responsive means including a master switch, means for varying the setting of said master switch, means for restoring the original setting of said switch, said pressure responsive means including selective means for selectively energizing said solenoids, an electric motor for operating said selective means, means actuated by operation of said motor for controlling the time interval of each energization of the motor, and means controlled by said time interval controlling means for controlling the direction of rotation of the motor.

25. The combination with a variable capacity air or gas compressor, of valves on said compressor for controlling the loading and unloading of the compressor, an electric motor for controlling operation of said valves, pressure operated means connected to said motor for controlling the energization of the motor and its direction of rotation, time interval controlling means connected to said motor between the motor and said pressure operated means for controlling the time interval of operation of the motor, and means controlled by operation of said motor for resetting said pressure operated means for successive operation.

GEORGE H. JUMP.